United States Patent
Chang et al.

(10) Patent No.: US 6,725,527 B2
(45) Date of Patent: Apr. 27, 2004

(54) METHOD OF MAKING A MAGNETIC HEAD ASSEMBLY HAVING OPEN YOKE WRITE HEAD WITH HIGHLY DEFINED NARROW TRACK WIDTH

(75) Inventors: Thomas Young Chang, San Jose, CA (US); Glen Adam Garfunkel, San Jose, CA (US); Edward Hin Pong Lee, San Jose, CA (US); Neil Leslie Robertson, Palo Alto, CA (US); Samuel Wonder Yuan, San Carlos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 250 days.

(21) Appl. No.: 09/908,083

(22) Filed: Jul. 18, 2001

(65) Prior Publication Data

US 2001/0037556 A1 Nov. 8, 2001

Related U.S. Application Data

(62) Division of application No. 09/299,542, filed on Apr. 26, 1999, now Pat. No. 6,330,128.

(51) Int. Cl.⁷ .............................................. G11B 5/127
(52) U.S. Cl. ................................ 29/603.14; 29/603.13; 29/603.23
(58) Field of Search ........................ 29/603.14, 603.13, 29/603.07, 603.23; 360/126, 313, 121, 125; 427/116, 130, 131, 132, 126

(56) References Cited

U.S. PATENT DOCUMENTS

| | | | |
|---|---|---|---|
| 4,490,760 A | * 12/1984 | Kaminaka et al. | 360/126 |
| 4,860,138 A | 8/1989 | Vinal et al. | 360/113 |
| 5,081,554 A | 1/1992 | Das | 360/113 |
| 5,159,511 A | 10/1992 | Das | 360/113 |
| 5,164,869 A | * 11/1992 | Fontana et al. | 360/318 |
| 5,583,725 A | * 12/1996 | Coffey et al. | 360/324.11 |
| 5,621,592 A | * 4/1997 | Gill et al. | 360/319 |
| 5,666,248 A | * 9/1997 | Gill | 360/324.1 |
| 5,703,740 A | * 12/1997 | Cohen et al. | 360/126 |
| 5,850,325 A | * 12/1998 | Miyauchi et al. | 360/126 |
| 5,894,388 A | * 4/1999 | Sato et al. | 360/126 |
| 5,896,254 A | * 4/1999 | Sato et al. | 360/126 |
| 5,949,625 A | * 9/1999 | Sato et al. | 360/126 |
| 5,959,813 A | * 9/1999 | Watanabe et al. | 360/126 |
| 6,156,375 A | * 12/2000 | Hu et al. | 360/126 |

* cited by examiner

Primary Examiner—Carl J. Arbes
Assistant Examiner—Tai Nguyen
(74) Attorney, Agent, or Firm—Ervin F. Johnston

(57) ABSTRACT

A magnetic head assembly has an open yoke type write head constructed on top of a read head so that the write head can be constructed with a very narrow track width without restraint by the requirements of the read head. The write head has first and second pole piece portions wherein the second pole piece portion has separate front and back layer portions. A coil layer is wrapped around only the first pole piece portion and the back layer portion so that the front layer portion can be constructed separately to provide a narrow track width. Further, in a preferred embodiment the front layer portion has a reduced thickness and a higher magnetic moment than the thickness and magnetic moment of the first pole piece portion and the back layer portion. Still further, in a preferred embodiment the first pole piece portion and the back layer portion are planar due to polarization of underlying layers.

28 Claims, 11 Drawing Sheets

METHOD OF MAKING A MAGNETIC HEAD ASSEMBLY HAVING OPEN YOKE WRITE HEAD WITH HIGHLY DEFINED NARROW TRACK WIDTH

CROSS-REFERENCE TO RELATED APPLICATION

This is a divisional application of application Ser. No. 09/299,542 filed Apr. 26, 19991 now U.S. Pat. No. 6,330,128.

BACKGROUND OF THE INVENTION

1. Field of the Invention

The present invention relates to a magnetic head assembly having an open yoke write head with a highly defined narrow track width and, more particularly, to a magnetic head assembly which includes the highly defined write head configured above a read head.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk adjacent the ABS causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

A prior art write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic field in the pole pieces which causes flux across the gap at the ABS for the purpose of writing the aforementioned magnetic impressions in tracks on moving media, such as in circular tracks on the aforementioned rotating disk.

In the prior art write head the second pole piece layer is directly above the first pole piece layer with only the aforementioned insulation stack located therebetween. Unfortunately, when the coil layer induces magnetic flux in the first and second pole pieces there is a portion of this flux that leaks between the first and second pole pieces which causes a reduction in a write signal across the gap. This loss is sometimes compensated for by increasing the number of turns of the pancake-shaped coil layer. An increase in the number of turns in the coil layer, however, increases heat within the head. The heat can cause a protrusion of an overcoat layer at the ABS due to expansion of the insulation stack. Further, the overlying relationship of the first and second pole pieces results in magnetic leakage which degrades the data rate performance. This means that there are less bits of information written by the write head per inch of track on the rotating disk. Accordingly, there is a strong felt need to provide a write head which has less leakage between the first and second pole pieces and improved heat dissipation.

The aforementioned problems were overcome in a commonly assigned U.S. Pat. No. 5,164,869. In this patent, first and second pole pieces formed an open yoke configuration and a coil wound around the first pole piece, and then wound around the second pole piece. With this arrangement there was less flux leakage between the first and second pole pieces and there was better heat dissipation because of short coil length. In the patent, a flux guide structure for a read head was located between the first and second pole pieces. The first and second read gap thickness along with the flux guide thickness becomes the total thickness of the write gap. Unfortunately, the write gap of the write head was restricted by the read head requirement. Further, since front portions of the first and second pole pieces at the ABS served as first and second shield layers for the flux guide, the track width of the write head could not be reduced below the width of the flux guide of the read head at the ABS. This restraint prevented optimizing the write head. Accordingly, there is strong-felt need to decouple the requirements of the write head portion from the requirements of the read head portion in order to permit the write head to have a narrow track width.

SUMMARY OF THE INVENTION

The present invention is an improvement of the aforementioned commonly assigned U.S. Pat. No. 5,164,869 which is incorporated by reference herein. In the present invention the improved write head is located on top of the read head. Accordingly, the present write head has an independently optimized write gap compared to the write gap taught by the aforementioned patent. The present write head includes first and second pole piece portions wherein the second pole piece portion has front and back layer portions. The front layer portion extends from the ABS, the back layer portion extends from a back gap site and the front and back layer portions overlap and magnetically engage one another at a site that is located between the ABS and the back gap. Accordingly, the write coil can be constructed on the first pole piece portion and the back layer portion of the second pole piece portion, leaving the front layer portion for a separate construction step. This allows the front layer portion, which defines the second pole tip, to be constructed with a very narrow track width at the ABS. This narrow track width allows more tracks to be written on a rotating magnetic disk which increases the magnetic storage capability of a disk drive that employs the write head. Further, the separate front layer portion of the second pole piece permits this component to be constructed of a high magnetic moment material that is higher than the magnetic moment of the material of the first pole piece portion and the material of the back layer portion of the second pole piece portion. This, in turn, permits the thickness of the front layer portion to be reduced which, in turn, permits construction of a still more narrow track width. The present invention also enables the first pole piece portion and the back layer portion of the second pole piece portion to be planarized.

An object of the present invention is to provide an open yoke write head which can be constructed with a narrow track width without impacting performance of an accompanying read head.

Another object is to provide an open yoke write head wherein a second pole tip portion has a narrow track width and a high magnetic moment.

Other objects and advantages of he invention will become more apparent to those skilled in the art after considering the following detailed description in connection with the accompanying drawings.

DESCRIPTION OF THE PREFERRED EMBODIMENTS

Magnetic Disk Drive

Figure 1:
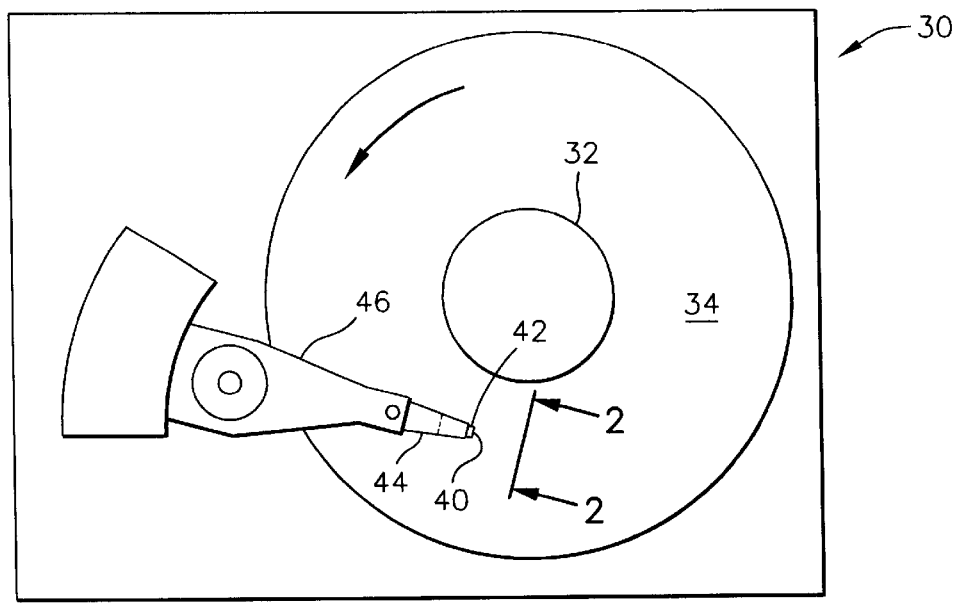
FIG. 1 is a planar view of an exemplary magnetic disk drive.
Figure 2:
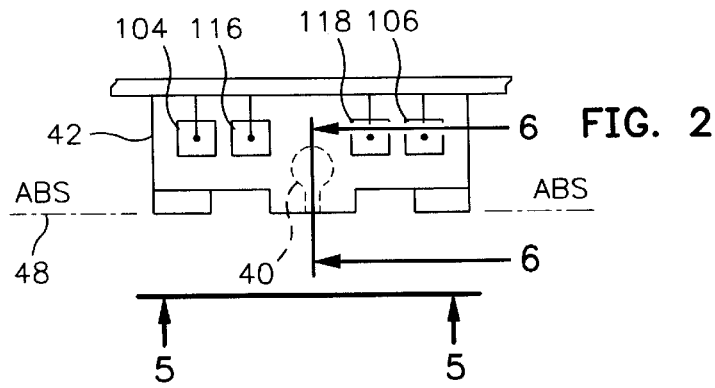
FIG. 2 is an end view of a slider with a magnetic head of the disk drive as seen in plane 2—2.
Figure 3:
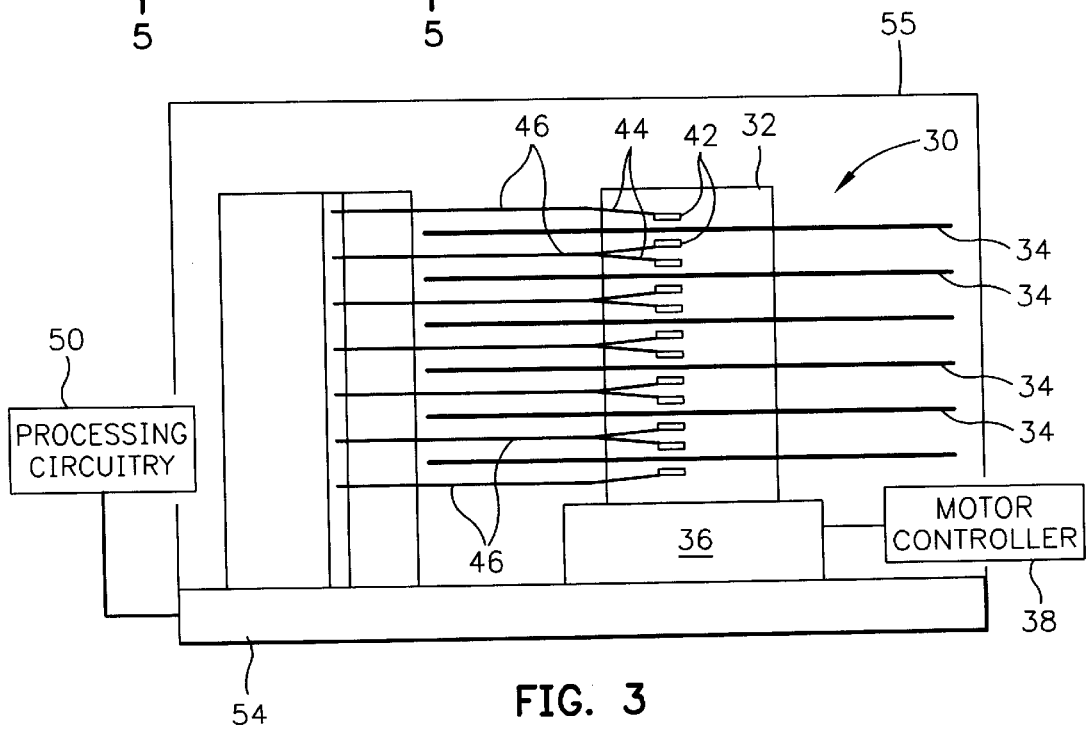
FIG. 3 is an elevation view of the magnetic disk drive wherein multiple disks and magnetic heads are employed.
Figure 4:
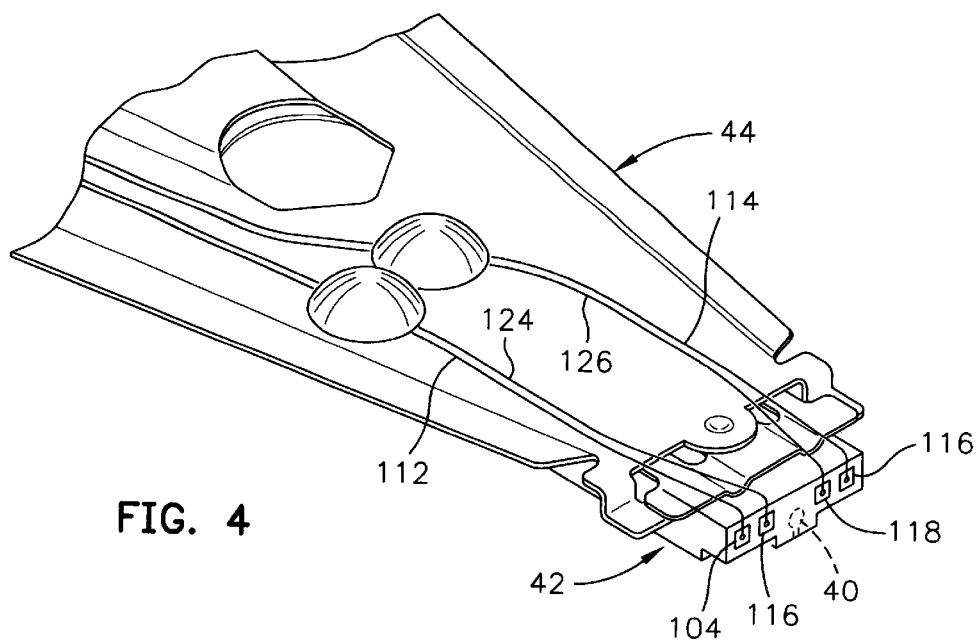
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A prior art combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 to 0.01 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
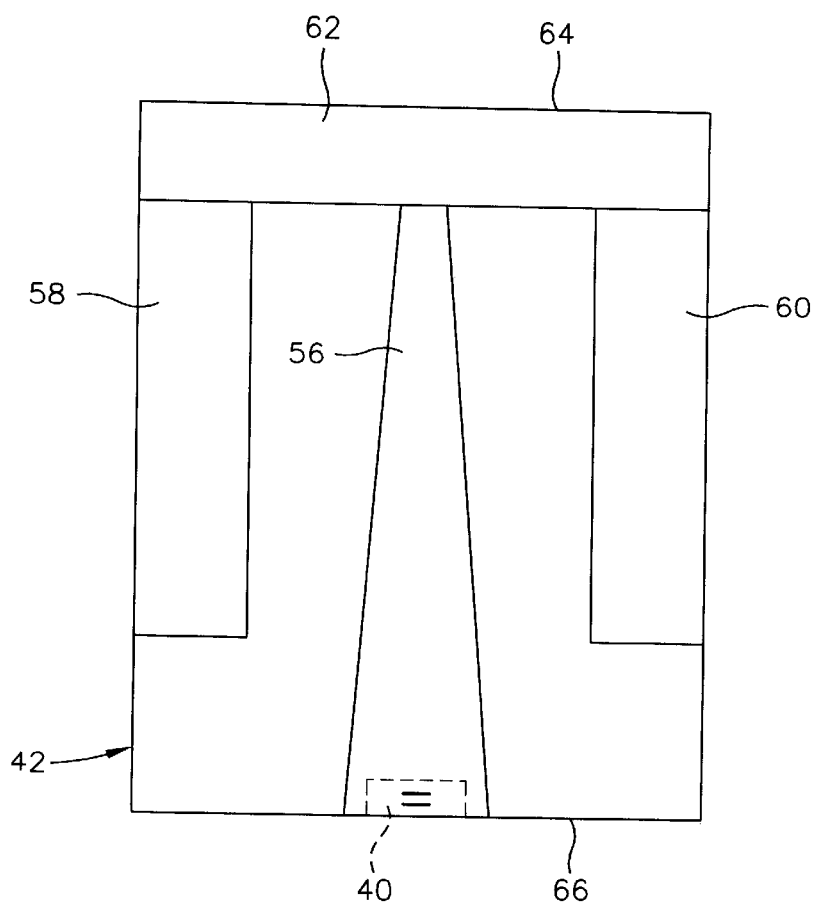
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Magnetic Head

Figure 6:
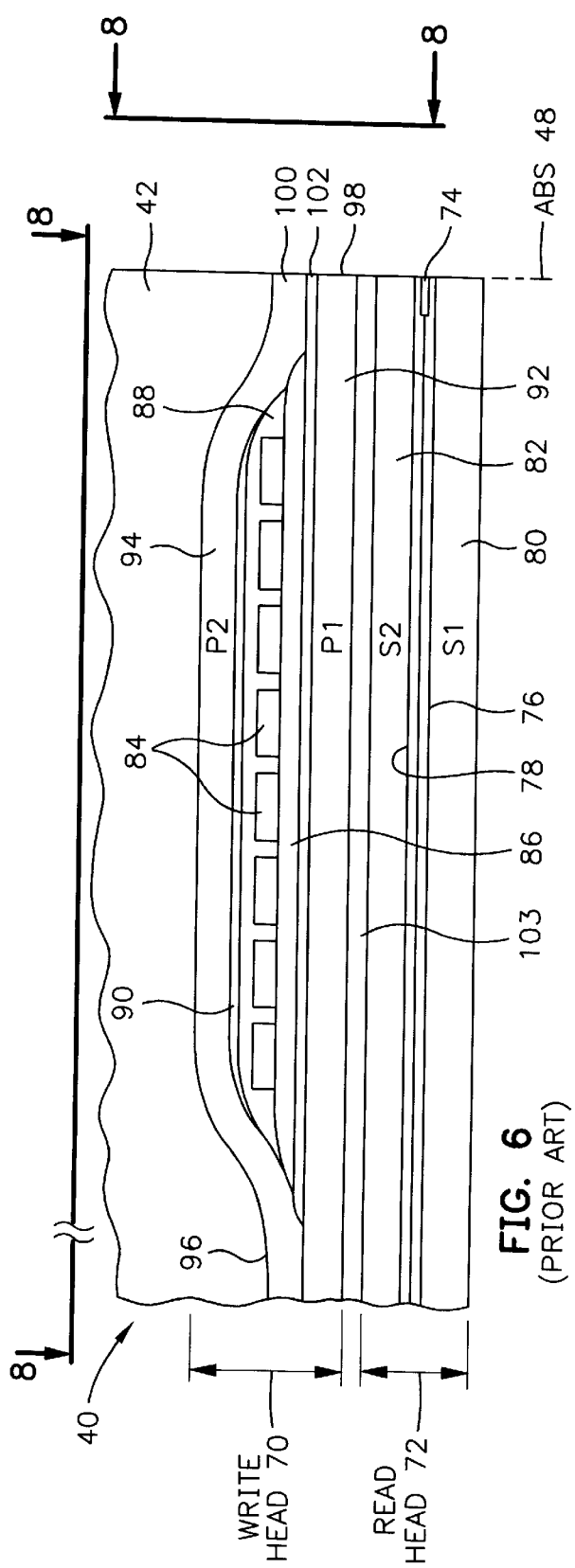
FIG. 6 is a partial view of the slider and a prior art magnetic head as seen in plane 6—6 of FIG. 2.
Figure 7:
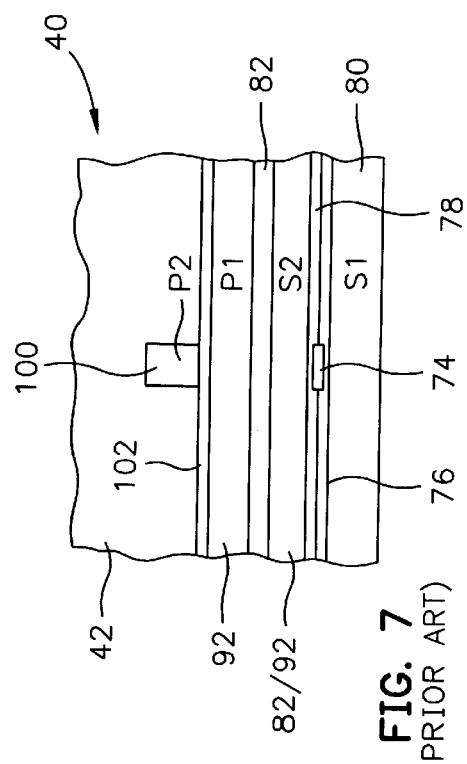
FIG. 7 is a partial ABS view of the slider taken along plane 7—7 of FIG. 6 to show the read and write elements of the prior art magnetic head.

FIG. 6 is a side cross-sectional elevation view of the prior art magnetic head 40, which includes a write head portion 70 and a read head portion 72, the read head portion having a sensor 74. FIG. 7 is an ABS view of FIG. 6. The 74 is sandwiched between first and second gap layers 76 and 78, and the gap layers are sandwiched between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 8:
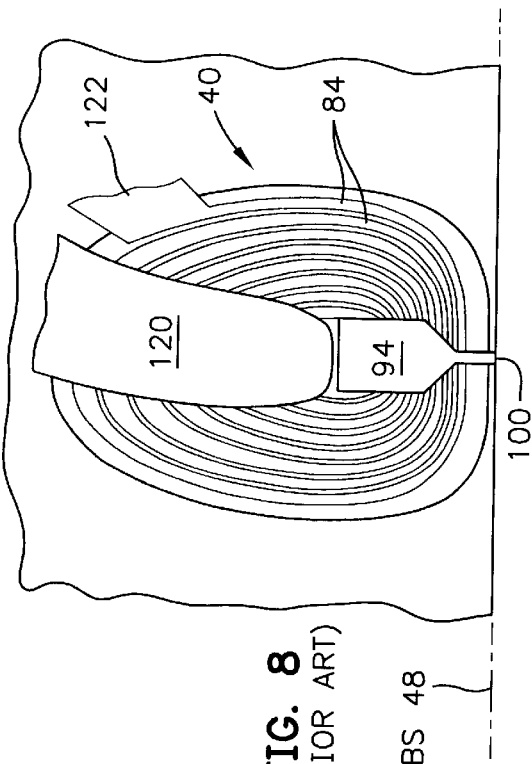
FIG. 8 is a view taken along plane 8—8 of FIG. 6 with all material above the write coil and write coil leads removed of the prior art magnetic head.

The write head portion of the magnetic head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. The first pole piece layer 92 is separated from the second shield layer 82 by an insulation layer 103. This head is known as a piggyback head because the second shield layer 82 and the first pole piece layer 92 are separate layers. In a merged head the second shield layer 82 and the first pole piece layer 92 are a common layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Unfortunately, because of the overlying relationship of the first and second pole pieces 92 and 94, as shown in FIG. 6, flux induced into these pole pieces by the pancake-shaped coil layer 84 leaks between these pole pieces, which reduces the amount of flux fringing across the gap 102 which, in turn, reduces the strength of the write signal written into the rotating magnetic disk. While this deficiency may be overcome by increasing the number of turns of the coil layer 84, this will increase coil resistance and the amount of heat generated by the head which may damage sensitive components in the read sensor 74 and/or cause the insulation stack (layers 86, 88 and 90) to expand and protrude an overcoat layer at 42 forwardly of the ABS. The increased coil turns may further require the first and second pole pieces 92 and 94 to have a longer length which further increases the flux leakage and reduces the efficiency of the write head. Further, the overlying relationship of the first and second pole pieces 92 and 94 increases magnetic inductance in the magnetic circuit of the write head. All of these effects reduce the number of bits per second which can be written into the rotating magnetic disk. This equates to an undesirable decrease in the data rate and a reduction in the storage capability of the magnetic disk drive. The present invention overcomes these problems as well as the aforementioned problems associated with the magnetic head assembly described by the aforementioned patent.

The Invention

Figure 9:
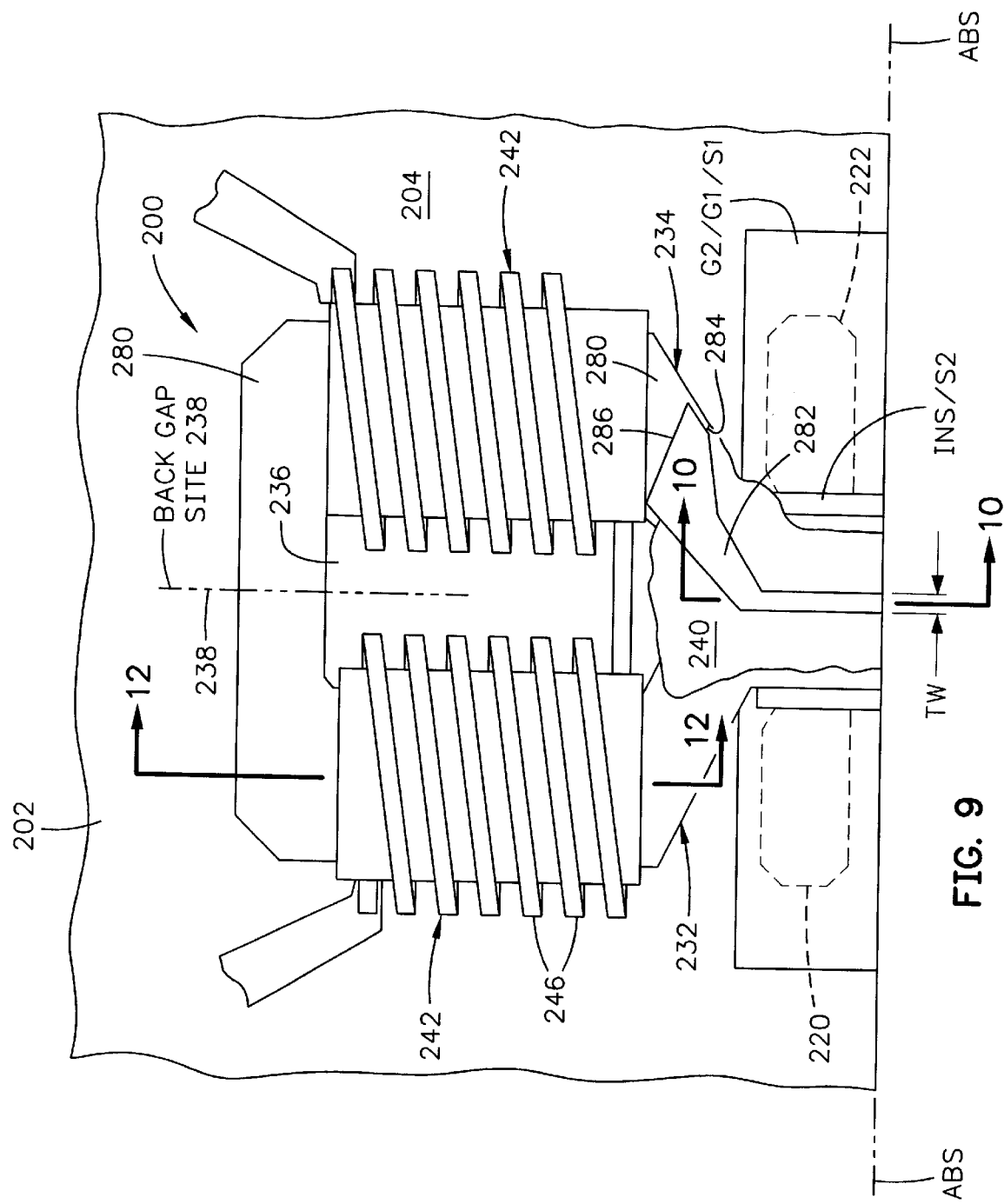
FIG. 9 is a plan illustration of a first embodiment of the present magnetic head assembly.
Figure 10:
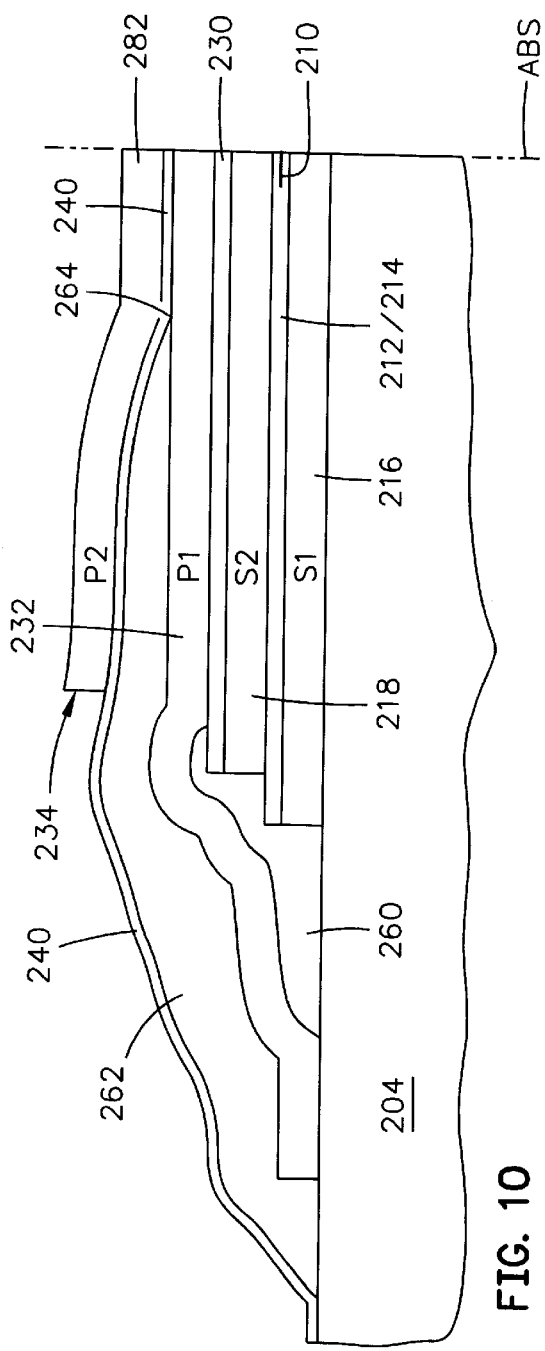
FIG. 10 is a view taken along plane 10—10 of FIG. 9.

A first embodiment 200 of the present magnetic head assembly is shown in part on a top flat surface 202 of aluminum oxide ($Al_2O_3$) of a substrate 204. As shown in FIGS. 9 and 10, the read head portion of the magnetic head assembly includes a sensor 210 that is located between first and second nonmagnetic electrically insulative first and second read gap layers 212 and 214 which, in turn, are located between ferromagnetic first and second shield layers 216 and 218. First and second lead layers 220 and 222 are connected to first and second side edges (not shown) of the sensor 210 which extend laterally and are connected to other lead layers (not shown) that extend rearwardly outside of the write head portion which is to be described next.

Figure 12:
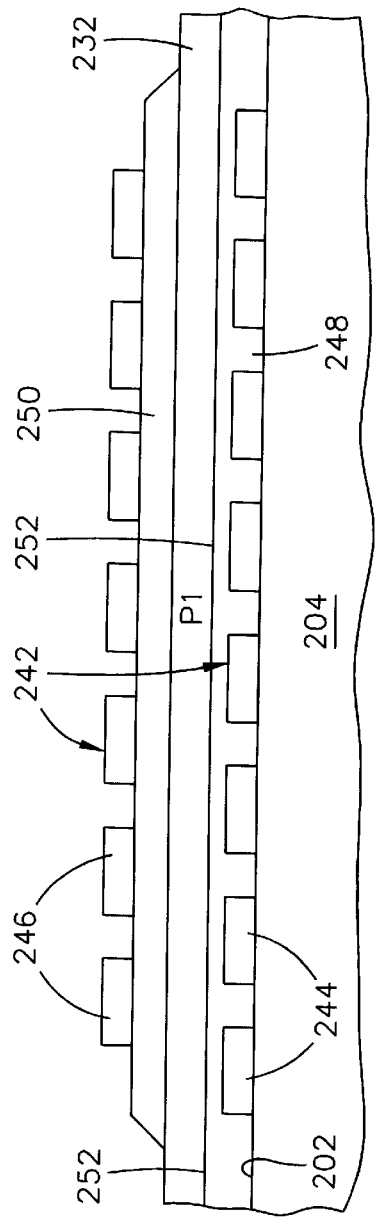
FIG. 12 is a view taken along plane 12—12 of FIG. 9.

The write head portion which is on top of the read head portion is separated from the read head portion by a nonmagnetic spacer layer 230. The write head portion includes first and second pole piece portions 232 and 234 that, when projected in a plane parallel to the top flat surface 202 of the substrate 204, extend about an opening 236 in an open yoke configuration. Each of the first and second pole piece portions 232 and 234 extend from the ABS to a back gap site 238. A nonmagnetic write gap layer 240 is located between the first and second pole piece portions 232 and 234 at the ABS. A nonmagnetic electrically conductive write coil 242 extends about one of the first and second pole piece portions 232 and 234 and thence about the other of the first and second pole piece portions in a helical relationship. As shown in FIG. 12, the write coil 242 that winds around the first pole piece portion 232 has bottom coil components 244 and top coil components 246. The bottom coil components 244, which are located on the top surface 202 of the substrate 204, are separated from the first pole piece portion 232 by a first insulation layer 248. The first pole piece portion 232 is separated from the top coil components 246 by a second insulation layer 250. The bottom and top coil components 244 and 246 are connected by studs (not shown) which extend through vias (not shown) in the first and second insulation layers 248 and 250, which construction is well known in the art.

Figure 13A:
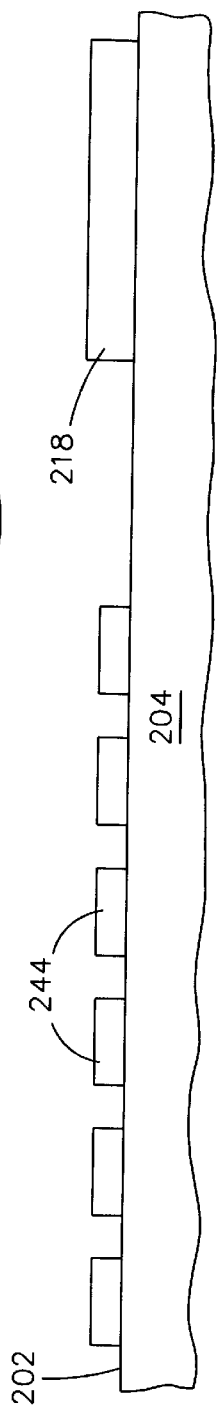
FIGS. 13A, 13B and 13C illustrate various steps in the construction of insulation with respect to bottom portions of the coil and the second shield layer.
Figure 13B:
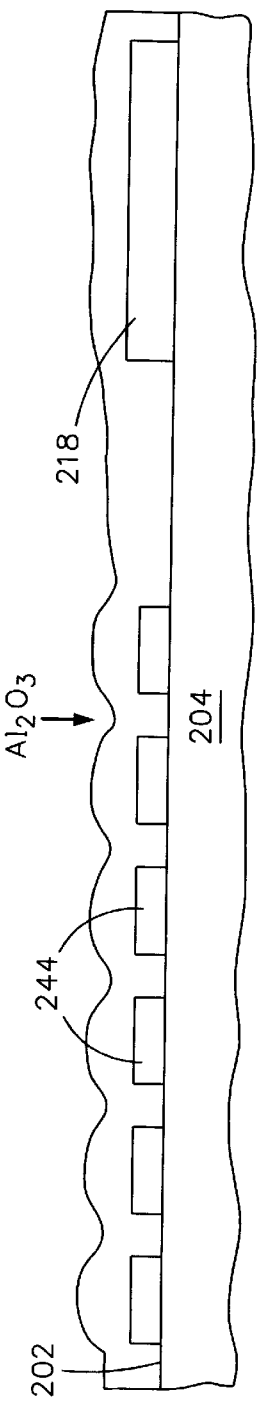
Figure 13C:
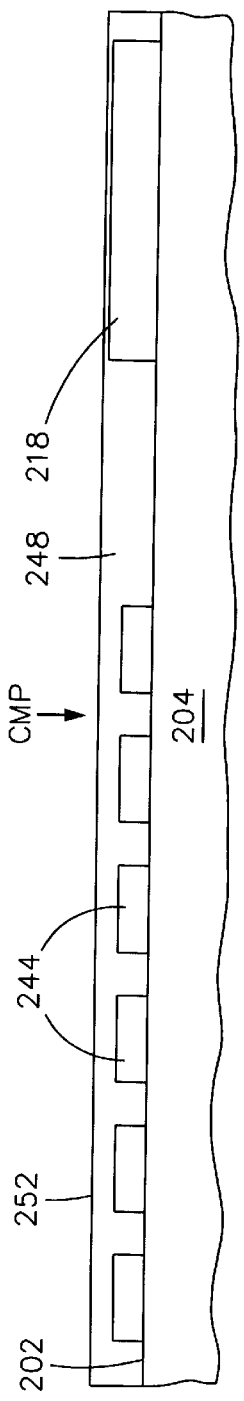

Exemplary construction of the insulation layer 248 is illustrated in FIGS. 13A–13C. In FIG. 13A the bottom write coil layer components 244 and the second shield layer 218 are shown constructed on the top surface 202 of the substrate 204. In FIG. 13B aluminum oxide ($Al_2O_3$) is sputter deposited on the substrate which results in an uneven top surface. In FIG. 13C the uneven top surface of the aluminum oxide is polished by chemical mechanical polishing (CMP) which results in a top planar surface 252 that is parallel to the top flat surface 202 of the substrate. The chemical mechanical polishing shown in FIG. 13C may leave a thin insulator thickness above the top portion of the second shield layer 218 which may provide the necessary spacer layer. The first pole piece portion 232 may be constructed on the surface 252, as shown in FIG. 12. The second insulation layer 250, shown in FIG. 12, may be a photoresist layer which covers the top of the first pole piece layer portion 232 and fills in on each side of the first pole piece layer portion on top of the surface 252. The photoresist layer 250 is spun on the wafer substrate, patterned and then hard baked to form the configuration shown in FIG. 12.

Figure 14A:
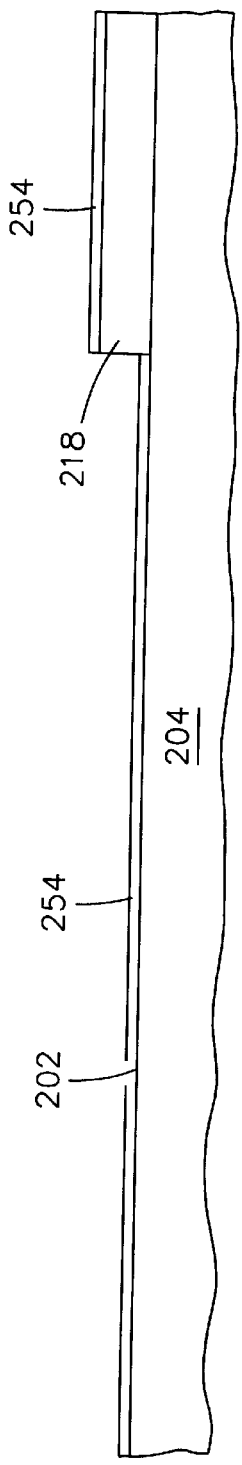
FIGS. 14A, 14B and 14C illustrate another method of constructing insulation for the bottom portions of the coil layer and the second shield layer.
Figure 14B:
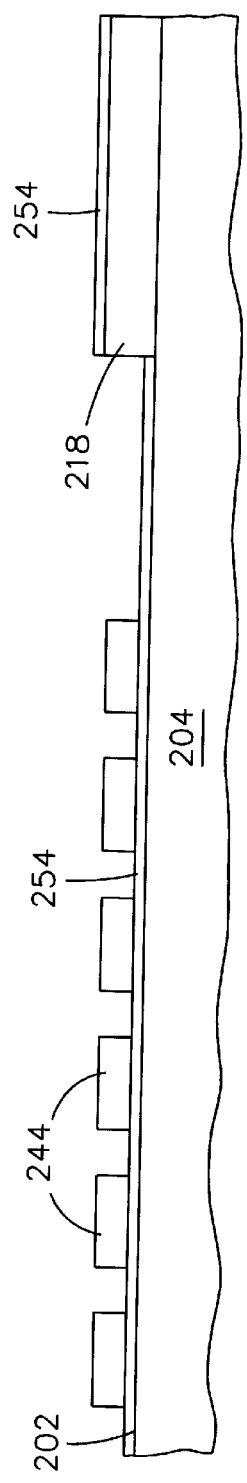
Figure 14C:
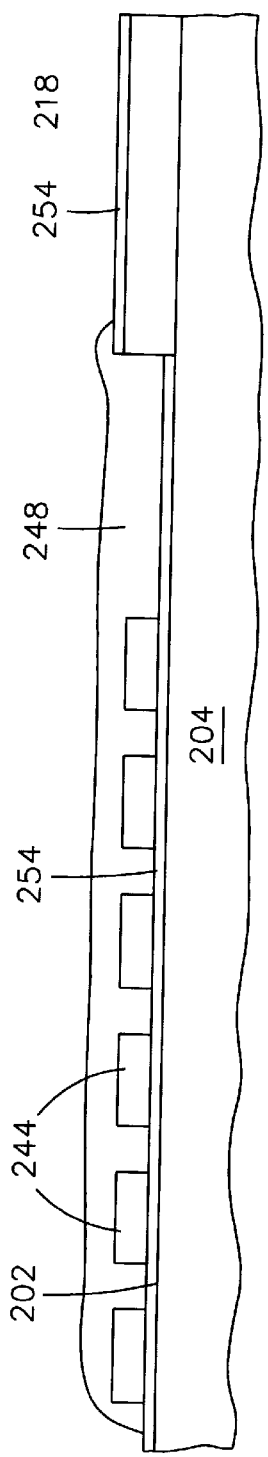

Another exemplary method of constructing a first insulation layer 248 is shown in FIGS. 14A–14C. The second shield layer 218 is formed on the top surface 202 of the substrate 204. As shown in FIG. 14A, a lower insulation layer 254 is sputter deposited on the second shield layer 218 and on the top surface 202 of the wafer substrate. In FIG. 14B the lower write coil components 244 are constructed on the lower insulation layer 254. In FIG. 14C photoresist is spun on the wafer, patterned and hard baked to provide the first insulation layer 248. The lower insulation layer 254 may provide the aforementioned spacer layer 230 shown in FIG. 10.

As shown in FIG. 10 back edges of the first and second shield layers 216 and 218 may be exposed when the shield layers are patterned. Insulation behind the first and second shield layers 216 and 218 may be removed which exposes the back edges of these layers. In order to cover these back edges a first photoresist layer 260 may be spun on the wafer, patterned and baked to provide the configuration shown in FIG. 10. The first pole piece portion 232 may extend rearwardly over the first photoresist layer 260 toward the back gap. A second photoresist layer 262 is shown on the first pole piece portion 232 which defines a zero throat height (ZTH) at 264. The zero throat height is the location where the first and second pole piece portions 232 and 234 first commence to separate after the ABS. The write gap layer 240 is located between the first and second pole piece portions 232 and 234 in a pole tip region of the write head and may extend over the top of the ZTH defining photoresist layer 262. This write gap layer can also be located under the resist layer 262 and on top of the first pole piece layer 232. The write gap layer 240 may remain as a full film on the write head, except for vias, or may be patterned as desired.

Figure 11:
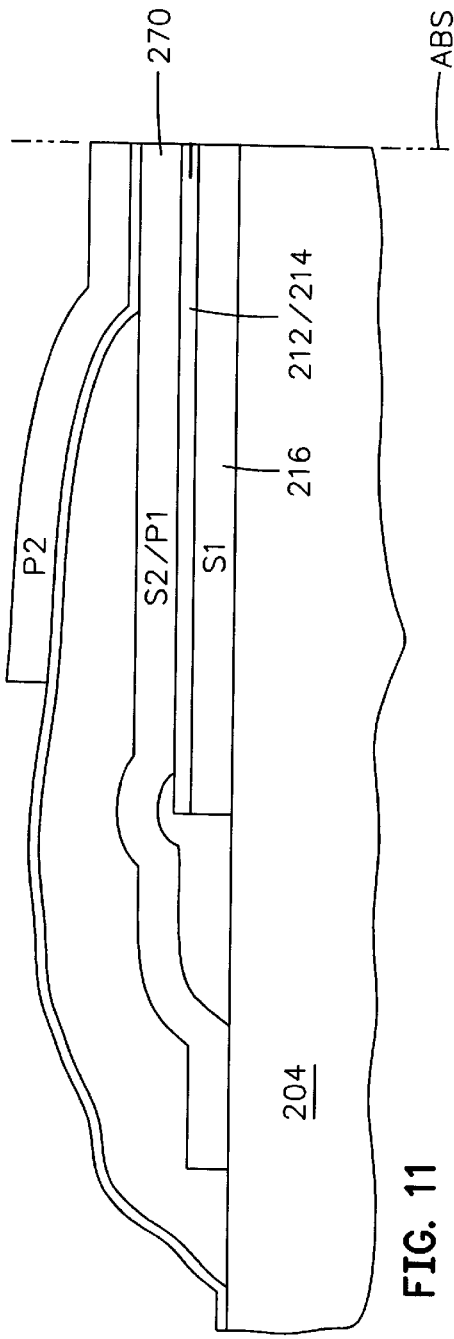
FIG. 11 is a view taken along the same plane as FIG. 10 showing a modification of the first embodiment.

The magnetic head assembly shown in FIGS. 9 and 10 is known in the art as a piggyback head since the second shield layer 218 and the first pole piece portion 232 are separate layers. When the second shield layer and the first pole piece portion are a common layer the magnetic head assembly is known in the art as a merged head, which is shown in FIG. 11. FIG. 11 differs from FIG. 10 in that there is no separate second shield layer 218 nor is there a spacer layer 230. Accordingly, a common layer 270 serves two functions, namely a second shield layer for the read head portion and a first pole piece portion for the write head portion.

As shown in FIG. 9, an aspect of the present invention is that the second pole piece portion 234 has back and front layer portions 280 and 282. The back layer portion 280 extends from the back gap site 238 to a first site 284 and the front layer portion 282 extends from the ABS to a second site 286. The front and back layer portions 282 and 280 magnetically engage one another between the first and second sites 284 and 286 in an overlapping relationship. The front layer portion 282 has a width at the ABS that defines the track width (TW) of the write head, which width is less than the width of the first pole piece portion 232 at the ABS. Accordingly, the wider portion of the first pole piece portion 232 at the ABS provides a planar surface for the write gap layer 240 and the construction of the pole tip portion of the front layer portion 282 that defines the track width.

With a photoresist frame constructed by standard photolithography techniques, the track width of the front layer portion 282 may be very narrow so as to promote high density tracks per inch (TPI). Further, the front layer portion 282 may be constructed of a high magnetic moment material which is higher than the magnetic moment of the material employed for the construction of the first pole piece portion 232 and the back layer portion 280 of the second pole piece portion 234. This is important because it allows more flux to be provided at the ABS without saturating the pole tip. The high magnetic moment material of the front layer portion 282 enables the reduction in the thickness of the front layer portion 282 as compared to the first pole piece portion 232 and the back layer portion 236 of the second pole piece portion 234. This may allow further reduction in the track width. Exemplary material for the front layer portion 282 is $Ni_{45}Fe_{55}$ and an exemplary material for the first pole piece portion 232 and the back layer portion 280 is $Ni_{81}Fe_{19}$.

In a preferred embodiment the thickness of the front layer portion 282 is less than a thickness of the first layer pole piece portion 232 and the back layer portion 280 of the second pole piece portion 234. Further, in the preferred embodiment the magnetic moment of the material of the front layer portion 282 is higher than the magnetic moment of the material of the first pole piece portion 232 and the back layer portion 280. Still further, in the preferred embodiment the first and second pole piece portions 232 and 234 are provided with first and second straight segments respectively around which the coil 246 is wound. An overcoat layer such as that shown at 42 in FIG. 6 covers the entire assembly shown in FIG. 10 which will cover the top exposed components of the write head.

Figure 15:
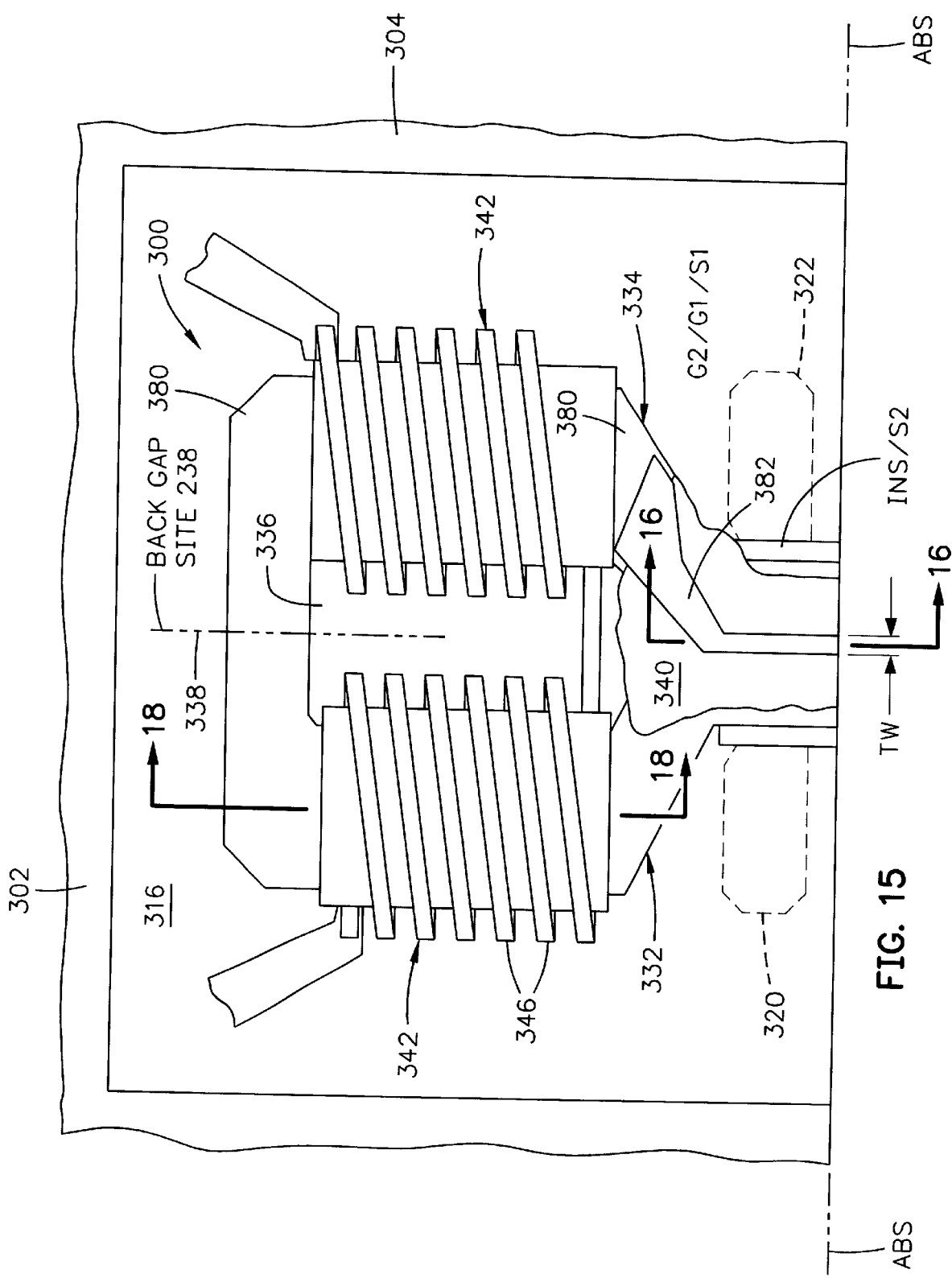
FIG. 15 is a plan illustration of a second embodiment of the present magnetic head assembly.
Figures 16, 17, 18:
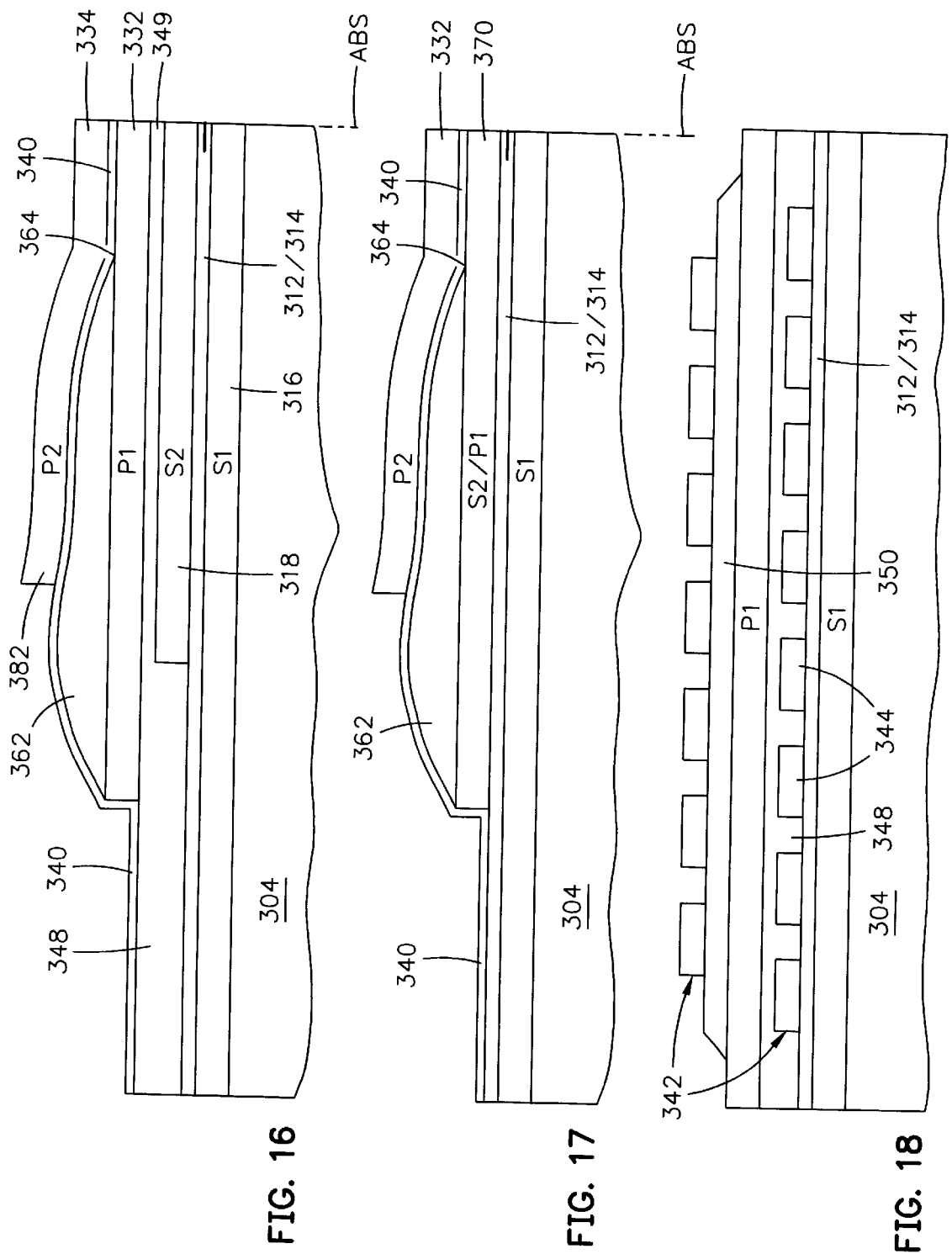
FIG. 16 is a view taken along plane 16—16 of FIG. 15.
FIG. 17 is a view taken along the same plane as FIG. 16 showing a modification of the second embodiment.
FIG. 18 is a view taken along plane 18—18 of FIG. 15.

A second embodiment 300 of the present magnetic head assembly is shown in FIGS. 15 and 16. This embodiment differs from the embodiment 200 shown in FIGS. 9 and 10 in that the first shield layer 316 and the first and second gap layers 312 and 314 extend throughout the expanse of the write head for polarization purposes. Accordingly, the first shield layer 316 is located below the bottom layer components 344 of the write coil layer 342 as shown in FIG. 18. The bottom layer components 344 of the write coil layer may be constructed directly on the first and second read gap layers 312/314. Aluminum oxide ($Al_2O_3$) may then be sputter deposited on the wafer and chemically mechanically polished (CMP) to form the first insulation layer 348, which not only covers the lower component portions 344 of the write coil layer but also provides a top layer portion 349 on top of the second shield layer 318. This planarizes the entire expanse of the write head which enables polarization of the first and second pole piece portions 332 and 334.

After constructing the first insulation layer 348 the first pole piece portion 332 and the back layer portion 380 of the second pole piece portion 334 are constructed as one layer which has common top and bottom film surfaces that lie in top and bottom planes that are parallel to the top surface 302 of the substrate 304. This obviates undesirable profiles in this layer so that the magnetic performance of the pole piece portions is improved. The ZTH defining insulation layer 362 is then constructed on top of the first pole piece portion 332 for defining the zero throat height 364. The write gap layer 340 is then deposited on top of the front pole tip portion of the first pole piece portion 332 and on top of the ZTH defining insulation layer 362. This write gap may also be deposited on the bottom of the resist layer 362. It may be patterned as desired to remove any portion of the write gap layer except for that portion between the first and second pole piece portion 332 and 334 at the ABS. The front layer portion 382 of the second pole piece portion 334 is then formed so as to overlap and magnetically engage the back layer portion 380 and form the track width of the write head as discussed hereinabove. As in the first embodiment the front layer portion 382 may have a reduced thickness and a higher magnetic moment than the thickness and magnetic moment of the first pole piece portion 332 and the back layer portion 380.

The configuration of a magnetic head assembly shown in FIG. 16 is a piggyback type head as discussed hereinabove. The magnetic head assembly shown in FIG. 17 is a merged magnetic head and, as discussed hereinabove, is the same as FIG. 16 except a common layer 370 provides a second shield for the read head portion and a first pole piece portion for the write head. The first pole piece portion 332 and the back layer component 380 of the second pole piece portion 334 can be planarized on top of the first and second read gap layers 312 and 314 which extend throughout the expanse of the write head.

Figure 19:
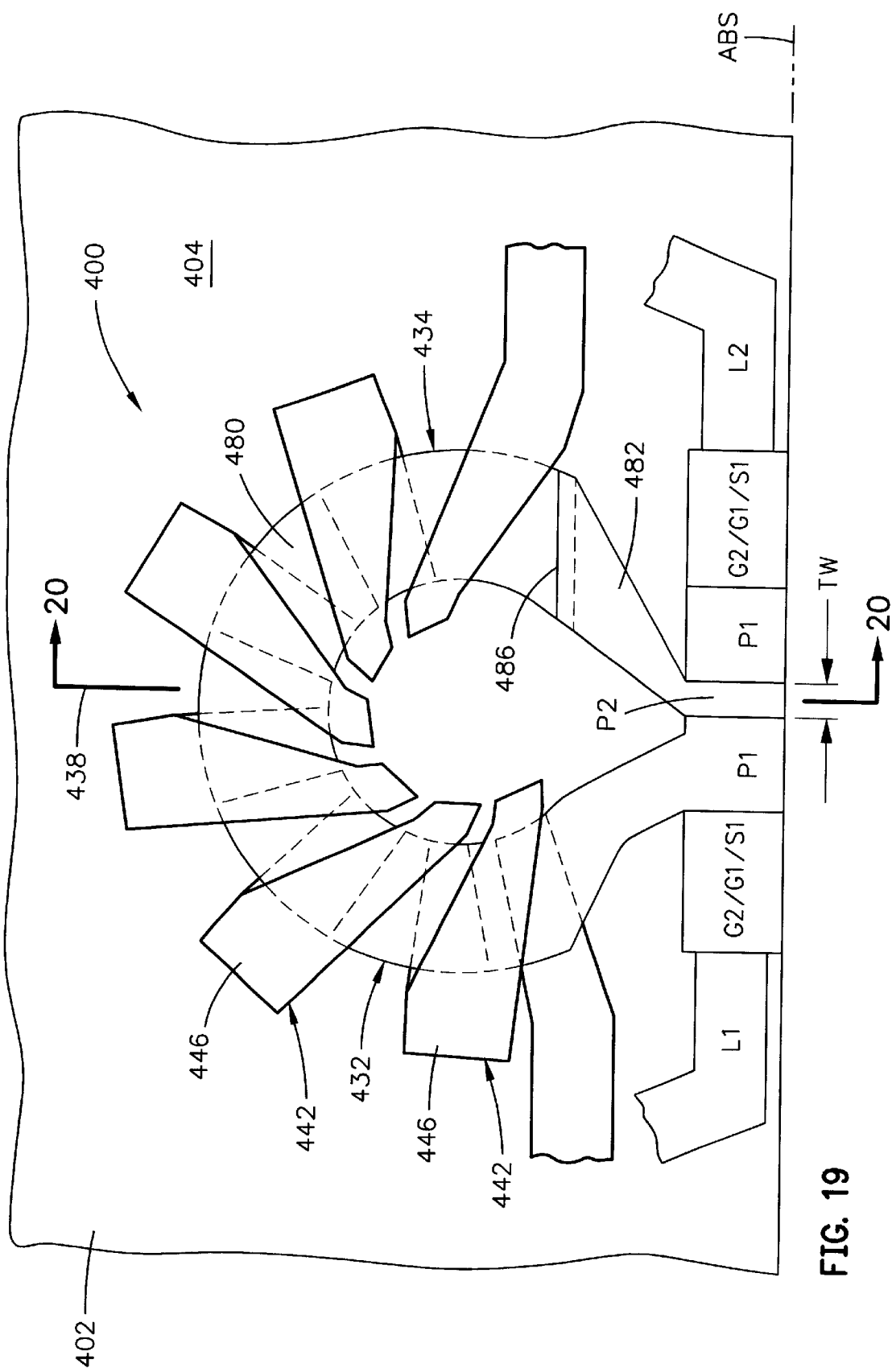
FIG. 19 is a plan illustration of a third embodiment of the present magnetic head assembly.
Figure 20:
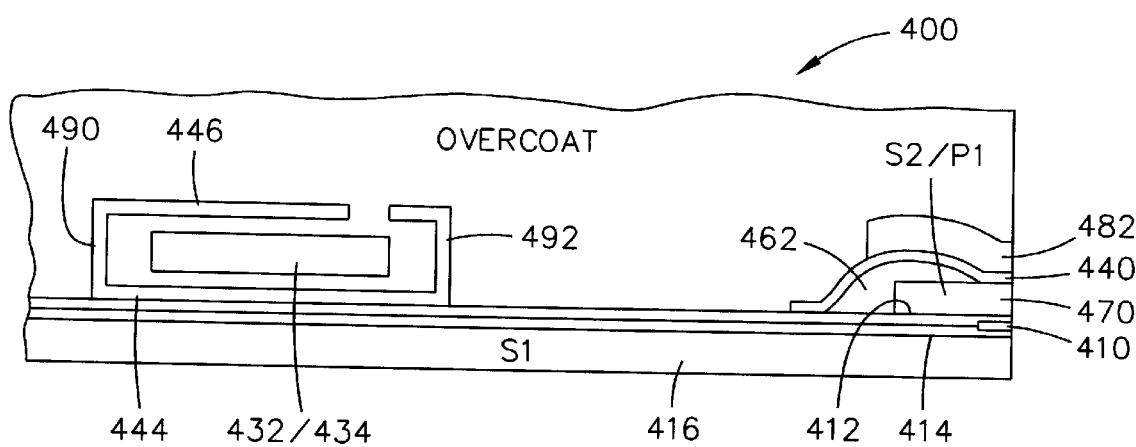
FIG. 20 is a view taken along plane 20—20 of FIG. 19.

A third embodiment 400 of the present magnetic head assembly is shown in FIGS. 19 and 20. This embodiment differs from the previous embodiment in that the first and second pole piece portions 432 and 434 are curved and the write coil 442 extends about these curved portions. FIG. 20 shows studs 490 and 492 which join the bottom and top components 444 and 446. The other reference numerals in FIGS. 19 and 20 that correspond to the same reference numerals in FIGS. 15–18, except that they are increased by 100, refer to similar components as those described for the second embodiment 300.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic head assembly on a flat film surface of a substrate wherein the assembly has a read head and a write head that have a track width and that form a portion of an air bearing surface (ABS) at a forward end of the assembly comprising in unordered sequence:

a making of the write head including:
    forming ferromagnetic first and second pole piece portions that extend from the ABS to a back gap site and that, when projected in a plane parallel to said film surface of the substrate, extend about an opening;
    forming a nonmagnetic write gap layer between the first and second pole piece portions at the ABS;
    forming a nonmagnetic electrically conductive write coil extending about one of the first and second pole piece portions and thence about the other of the first and second pole piece portions;

a making of the read head including:
    forming a read sensor between first and second nonmagnetic electrically insulative read gap layers;
    forming a ferromagnetic first shield layer with the first and second gap layers being located between the first shield layer and the first pole piece portion of the write head.

2. A method of making a magnetic head assembly on a flat film surface of a substrate wherein the assembly has a read head and a write head that have a track width and that form a portion of an air bearing surface (ABS) at a forward end of the assembly comprising in unordered sequence:

a making of the write head including:
forming ferromagnetic first and second pole piece portions that extend from the ABS to a back gap site and that, when projected in a plane parallel to said film surface of the substrate, extend about an opening;
forming a nonmagnetic write gap layer between the first and second pole piece portions at the ABS;
forming a nonmagnetic electrically conductive write coil extending about one of the first and second pole piece portions and thence about the other of the first and second pole piece portions;
forming the second pole piece portion with front and back layer portions with the back layer portion extending from the back gap site to a first site that is located between the ABS and the write coil about the second pole piece portion and with the front layer portion extending from the ABS to a second site that is located between the ABS and said write coil about the second pole piece portion so that the first site is located between the ABS and said second site and the second site is located between the first site and said back gap site;

a making of the read head including:
forming a read sensor between first and second non-magnetic electrically insulative read gap layers;
forming a ferromagnetic first shield layer with the first and second gap layers being located between the first shield layer and the first pole piece portion of the write head;
magnetically engaging the front and back layer portions of the second pole piece portion with one another between said first and second sites; and
forming the front layer portion of the second pole piece portion with a width at the ABS that defines said track width of the write head and that is less than a width of the first pole piece portion at the ABS.

3. A method as claimed in claim 2 including:
forming the first pole piece portion with a front portion at the ABS that interfacially engages the second read gap layer.

4. A method as claimed in claim 2 including:
forming the read head with a ferromagnetic second shield layer;
the first and second read gap layers being formed between the first and second shield layers; and
forming a nonmagnetic electrically insulative spacer layer located between the second shield layer and the first pole piece portion.

5. A method as claimed in claim 2 including:
forming a zero throat height (ZTH) defining insulation layer between the first pole piece portion and the front layer portion for commencing separation of the front layer portion from the first pole piece portion at a ZTH location between the ABS and said back gap site.

6. A method as claimed in claim 2 including:
between the ABS and the back gap site, forming the first pole piece portion and the back layer portion of the second pole piece portion with first and second straight segments respectively; and
with respect to said first and second pole piece portions, extending said write coil about only each of said first and second straight segments.

7. A method as claimed in claim 6 wherein the first and second straight segments are formed with a common first film surface that lies in a plane that is parallel to said flat film surface of the substrate.

8. A method as claimed in claim 2 including:
between the ABS and the back gap site, forming the first pole piece portion and the back layer portion of the second pole piece layer portion with first and second curved segments respectively; and
with respect to said first and second pole piece portions, extending the write coil about only each of said first and second curved segments.

9. A method as claimed in claim 8 wherein the first and second curved segments are formed with a common first film surface that lies in a plane that is parallel to said flat film surface of the substrate.

10. A method as claimed in claim 2 including:
forming each of the first pole piece portion and the back layer portion with a first thickness and forming the front layer portion with a second thickness wherein the second thickness is less than the first thickness.

11. A method as claimed in claim 10 forming the front layer portion with a magnetic moment that is greater than a magnetic moment of each of the first pole piece portion and the back layer portion.

12. A method as claimed in claim 11 wherein all of the first pole piece portion and the back layer portion are formed with a common first film surface that lies in a plane that is parallel to said flat film surface of the substrate.

13. A method as claimed in claim 12 including:
forming a zero throat height (ZTH) defining insulation layer between the first pole piece portion and the front layer portion for commencing separation of the front layer portion from the first pole piece portion at a ZTH location between the ABS and said back gap site.

14. A method as claimed in claim 13 including:
between the ABS and the back gap site, forming the first pole piece portion and the back layer portion of the second pole piece portion with first and second straight segments respectively; and
with respect to said first and second pole piece portions, extending said write coil about only each of said first and second straight segments.

15. A method as claimed in claim 14 including:
forming the first pole piece portion with a front portion at the ABS that interfacially engages the second read gap layer.

16. A method as claimed in claim 14 including:
forming the read head with a ferromagnetic second shield layer;
the first and second read gap layers being formed between the first and second shield layers; and
forming a nonmagnetic electrically insulative spacer layer located between the second shield layer and the first pole piece portion.

17. A method as claimed in claim 14 wherein the front layer portion is formed of $Ni_{45}Fe_{55}$ and each of the first pole piece portion and the back layer portion is formed of $Ni_{80}Fe_{20}$.

18. A method of making a magnetic head assembly on a flat film surface of a substrate wherein the assembly has a read head and a write head that have a track width and that form a portion of an air bearing surface (ABS) at a forward end of the assembly comprising in unordered sequence:
a making of the write head including:

forming ferromagnetic first and second pole piece portions that extend from the ABS to a back gap site and that, when projected in a plane parallel to said film surface of the substrate, extend about an opening;

forming a nonmagnetic write gap layer between the first and second pole piece portions at the ABS;

forming a nonmagnetic electrically conductive write coil means extending about the first and second pole piece portions;

a making of the read head including:

forming a read sensor between first and second nonmagnetic electrically insulative read gap layers;

forming a ferromagnetic first shield layer with the first and second gap layers being located between the first shield layer and the first pole piece portion of the write head;

forming the second pole piece portion with front and back layer portions with the back layer portion extending from the back gap site to a first site that is located between the ABS and the write coil about the second pole piece portion and with the front layer portion extending from the ABS to a second site that is located between the ABS and said write coil about the second pole piece portion so that the first site is located between the ABS and said second site and the second site is located between the first site and said back gap site;

magnetically engaging the front and back layer portions of the second pole piece portion with one another between said first and second sites; and forming the front layer portion of the second pole piece portion with a width at the ABS that defines said track width of the write head and that is less than a width of the first pole piece portion at the ABS.

19. A method as claimed in claim 18 including:

forming a zero throat height (ZTH) defining insulation layer between the first pole piece portion and the front layer portion for commencing separation of the front layer portion from the first pole piece portion at a ZTH location between the ABS and said back gap site.

20. A method as claimed in claim 19 including:

between the ABS and the back gap site, forming the first pole piece portion and the back layer portion of the second pole piece layer portion with first and second curved segments respectively; and with respect to said first and second pole piece portions, extending the write coil means about only each of said first and second curved segments.

21. A method as claimed in claim 20 wherein the first and second curved segments are formed with a common first film surface that lies in a plane that is parallel to said flat film surface of the substrate.

22. A method as claimed in claim 19 including:

forming each of the first pole piece portion and the back layer portion with a first thickness and forming the front layer portion with a second thickness wherein the second thickness is less than the first thickness.

23. A method as claimed in claim 22 forming the front layer portion with a magnetic moment that is greater than a magnetic moment of each of the first pole piece portion and the back layer portion.

24. A method as claimed in claim 23 wherein all of the first pole piece portion and the back layer portion are formed with a common first film surface that lies in a plane that is parallel to said flat film surface of the substrate.

25. A method as claimed in claim 19 including:

between the ABS and the back gap site, forming the first pole piece portion and the back layer portion of the second pole piece portion with first and second straight segments respectively; and with respect to said first and second pole piece portions, extending said write coil means about only each of said first and second straight segments.

26. A method as claimed in claim 25 wherein the first and second straight segments are formed with a common first film surface that lies in a plane that is parallel to said flat film surface of the substrate.

27. A method as claimed in claim 26 including:

forming the first pole piece portion with a front portion at the ABS that interfacially engages the second read gap layer.

28. A method as claimed in claim 27 including:

forming the read head with a ferromagnetic second shield layer;

the first and second read gap layers being formed between the first and second shield layers; and forming a nonmagnetic electrically insulative spacer layer located between the second shield layer and the first pole piece portion.

* * * * *